United States Patent [19]
Jackowski et al.

[11] 4,448,426
[45] May 15, 1984

[54] UNITIZED OIL SEALS

[75] Inventors: Ronald A. Jackowski, Algonquin; Glenn W. Peisker, Barrington, both of Ill.

[73] Assignee: Chicago Rawhide Manufacturing Company, Elgin, Ill.

[21] Appl. No.: 280,888

[22] Filed: Jul. 6, 1981

[51] Int. Cl.³ .............................................. F16J 15/34
[52] U.S. Cl. ........................................ 277/37; 277/153
[58] Field of Search .................... 277/35, 37, 152, 153, 277/147, 148

[56] References Cited

U.S. PATENT DOCUMENTS

| | | | |
|---|---|---|---|
| 2,867,457 | 1/1959 | Riesing et al. | 277/153 |
| 3,021,161 | 2/1962 | Rhoads et al. | 277/153 |
| 3,179,424 | 4/1965 | Carson et al. | 277/37 |
| 3,341,264 | 9/1967 | Otto | 277/37 |
| 4,037,849 | 7/1977 | Thumm | 277/153 |
| 4,283,063 | 8/1981 | Prescott | 277/153 |

*Primary Examiner*—Robert I. Smith
*Attorney, Agent, or Firm*—James T. FitzGibbon

[57] ABSTRACT

A unitized oil seal with inner and outer rigid casings. A seal lip body with primary and auxiliary sealing lips is bonded to the outer casing, and the sealing lip cooperates with an axial flange on the inner casing to provide a fluid-tight seal band area. The outer casing includes an auxiliary rubber or metal element which positions a locking flange on the inner casing against axial displacement. The axial flange on the inner casing has a radially inturned edge on the end opposite the locking flange to facilitate assembly. The inside diameter of the inner casing and the outside diameter of the outer casing include rubber or plastic sleeves for ease of installation on an associated sealed mechanism.

13 Claims, 13 Drawing Figures

UNITIZED OIL SEALS

The present invention relates generally to oil seals, and more particularly, to so-called unitized oil seals intended specifically for motor vehicles and related applications.

By "unitized" as used herein is meant oil seals in which the primary sealing lip portion and the portion with which such sealing lip is associated in use to form a relatively movable or so-called primary sealare both incorporated within a single oil seal which is sold as a unit. The primary seal may, but need not, also include one or more auxiliary lips, sometimes referred to as "dirt lips" or "excluder lips", the function of which is to keep dirt from the vicinity of the primary lip. Accordingly, the control over the primary seal conditions may be accomplished by the manufacturer, rather than depending upon cooperation between parts manufactured by a seal maker and parts manufactured by the user, such as manufacturers of axles, housings, bearings, shafts, or the like.

Oil seals of the type with which the present invention are concerned also normally include two so-called secondary seals, that is, seals wherein relative motion does not take place. One such seal is on a relatively movable part such as an axle or the like, and the other is on a stationery part, such as a housing. In certain other cases, such as in heavy trucks, while the seal assembly includes two portions adapted to form secondary seals, the shaft is sometimes a stationary part and the counterbore or the like is formed in a cap which rotates with the wheel. Because one seal part engages a radially inner sealed component and the other engages an outer component, the seal elements may be referred to "inner" and "outer" elements for convenience.

In any case, problems in sealing applications of the type with which the invention are concerned relate to improper sealing conditions which may be caused by installation of the seal, by handling of the seal after manufacture and before or during shipment, and by leakage which is occasioned by improper relative fit between parts, improper positioning, or improper manufacture of one or both of the sealed parts.

According to the invention, an easy to install, highly reliable secondary seal is formed on the inside diameter of the unitized seal of the invention, and a similar seal is formed on the outside diameter of the seal, with the primary or relative motion seal occurring between parts of the two members forming the unitized seal. According to the invention, both the inner and outer seal elements have cooperating means associated therewith to insure that the seal may be shipped and installed as a unit, and accordingly, there is a slight axial play or movement permitted between parts, but this free play is kept within designed tolerances during shipping, installation and actual use of the seal.

Referring to the prior art, while unitized seals have met with considerable success, including seals of the type described in U.S. Pat. No. 3,762,726, such seals have often been rather difficult to install without the use of special tools. Accordingly, their use has been generally limited to original equipment manufacture applications, and those replacement applications in which the repair or rebuilding facility has the equipment necessary to make the installation.

Needless to say, in applications wherein the seal itself is of large diameter and overall size generally, and is required to have portions placed over stub shafts or the like, as well as portions adapted to be received within a counterbore, the seal tends to be made from rather heavy gauge metal parts. Installation of parts of this sort under tight secondary seal conditions often requires the application of considerable force. Where this is true, it is very important that the seal be aligned properly before the force is applied, and that means be provided to insure that the seal is not cocked or otherwise installed irregularly in relation to the sealed parts.

Because of the difficultly in installing seals of this type, there has existed in the prior art a need for a seal which is easy to install but which, when installed, is highly reliable in use. There has also been a need for manufacturing a seal which may be installed reliably at low cost and which does not require the use of highly precise components, yet which achieves excellent reliability in sealing. In this connection, it will be appreciated that the cost of seals is relatively low in relation to the cost of the sealed parts, and that an improperly installed seal, or one that leaks prematurely in use, requires labor and other repair cost which are very great in relation to the cost of the seal itself.

In addition, warranty replacement costs themselves create potentially serious problems, including those of legal liability, warranty claim handling cost and, viewed from the standpoint of the consumer, a poor image of the manufacturer. Replacing seals also means that equipment down time will occur, causing additional expense and inconvenience to the user.

Accordingly, in view of shortcomings of prior art seals, it is an object of the present invention to provide an improved unitized seal.

Another object of the invention is to provide a unitized seal having inner and outer casing elements, with each element including an associated mounting portion adapted to provide a snug, fluid tight seal with associated machine parts.

A still further object is to provide a unitized seal having inner and outer assemblies each adapted to be associated in use with a machine part, with at least one of the assemblies using a plurality of elements adapted to cooperate with each other and the sealed parts to insure an easy, low cost, reliable installation which can be accomplished without the use of special tools or equipment.

A further object is to provide a unitized seal which is easy to install and yet which has all of the favorable operating characteristics of prior art unitized seals, and in some cases, operating characteristics which are further improved with respect thereto.

Another object of the invention is to provide a unitized seal having a radially inner element which includes a casing portion, means for locating a secondary seal element in a captive position, and one or more secondary seal forming elements retained within said positioning means and adapted to create a tight secondary seal in use.

A still further object of the invention is to provide a unitized seal having inner and outer casing elements, having means providing free but limited axial movement between these parts, and providing an elastomeric outer diameter seal portion for easy but fluid tight installation with a portion of the sealed mechanism.

A still further object of the invention is to provide a unitized seal having a variety of improved mechanisms for achieving a satisfactory secondary seal.

Yet another object is to provide a unitized seal which will provide one or more secondary seals which combine ease of installation with good sealing action, and in some cases, which utilize novel materials and components for this purpose.

The foregoing and other objects and advantages of the invention are achieved in practice by providing an easily installed, unitized seal assembly which includes inner and outer mounting assemblies and, associated with one of said mounting assemblies, a primary seal lip unit, and with the other of said assemblies, a cooperating seal surface, with said inner and outer mounting assemblies each having means for secondarily sealing an associated part of a mechanism to be sealed, said unit further including cooperative means for unitizing said seal against undesired axial movement of said mounting assemblies relative to each other so as to maintain said seal lip and said cooperating surface in axially aligned relation.

The manner in which the foregoing and other objects of the invention are carried into practice will become more clearly apparent when reference is made to the accompanying detailed description of the preferred embodiments set forth by way of example, and shown in the accompanying drawings, wherein like reference numbers indicate corresponding parts throughout.

BRIEF DESCRIPTION OF THE DRAWINGS

FIG. 6 is a vertical sectional view, with portions broken away, of a preferred form of oil seal made according to the invention and showing the seal associated with a shaft or the like.

DESCRIPTION OF THE PREFERRED EMBODIMENTS OF THE INVENTION

While it will be understood that the invention may be embodied in a number of different forms, and that the seal of the invention is capable of being used in a number of applications, a detailed description of the invention will be given wherein the seal is used in a heavy duty truck or like application; wherein the sealed medium is oil, and wherein the primary lip seal is a radially inwardly acting seal unit. As pointed out above, either the radially inner or the radially outer portion of the seal may be associated with a movable machine member, and the other portion will then be associated with a fixed or non-rotatable machine member.

Reference is sometimes made herein to axially "inner" or "outer", or to the "air side" or "oil side" of the seal. As is known in the art, the so-called "oil side" of the seal is the portion of the seal facing toward the sealed region, and "axially inner" refers to the direction lying toward such sealed region.

In FIGS. 1-5, for example, the sealed region lies to the left and in FIGS. 6-13, it lies toward the right; the more steeply inclined surface of the seal lip generally lies on the oil side, and, if the sealed region were completely filled with oil, the garter spring would be in contact therewith. Portions on the air side of the seal would not be so exposed.

Figures 1, 3:
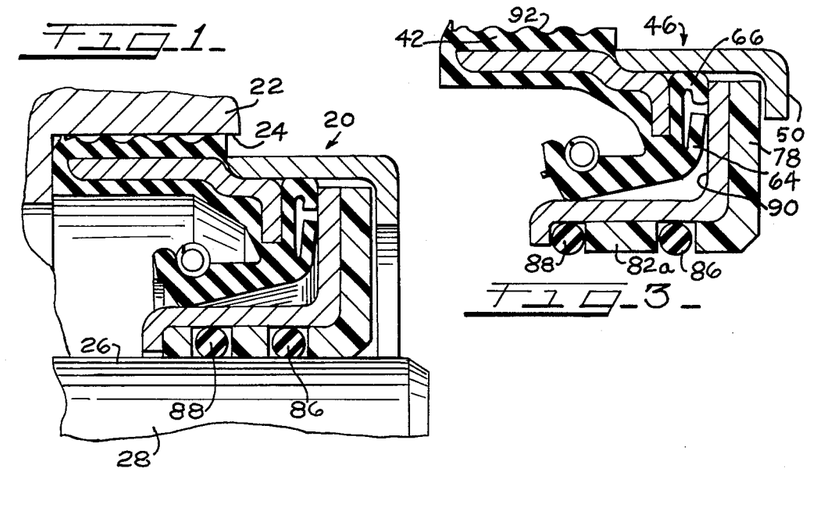
FIG. 1 is a vertical sectional view of a portion of an oil seal made according to the invention, and showing one part of the seal received in an associated machine part counterbore and showing a portion of a shaft receiving the other part of the seal assembly.
FIG. 3 is a vertical sectional view of the seal of FIG. 1, showing the seal unit as sold and delivered by the manufacturer.
Figures 2, 4, 5:
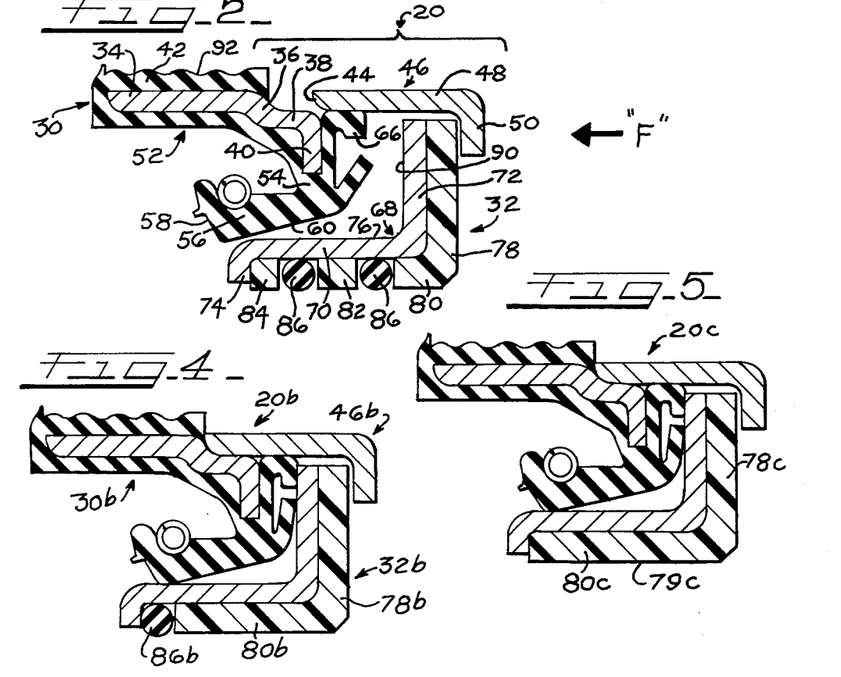
FIG. 2 is a partially exploded view of the seal assembly of FIG. 2.
FIG. 4 is a vertical sectional view of another embodiment of the composite seal unit of the invention.
FIG. 5 is a vertical sectional view of a portion of a still further modified form of oil seal embodying the invention.

Referring now to the drawings in greater detail, FIGS. 1-3 show one embodiment of a unitized seal assembly made according to the invention. The seal assembly generally identified as 20 is shown to form a seal between a relatively fixed or rotatable machine element 22 having a seal-receiving counterbore 24 therein and the radially outer surface 26 of a fixed or rotatable shaft 28.

The seal assembly 20 includes a radially outer seal assembly generally designated 30 (FIG. 2) and a radially inner seal assembly generally designated 32. The outer seal unit 30 includes a rigid mounting flange 34 which is of an annular configuration and which extends axially a length approximately equal to the axial depth of the counterbore 24.

Axially outwardly of the rigid mounting flange 34 is a shoulder 36 terminating in a collar 38 of reduced diameter, and axially outwardly thereof is a radially inturned, seal body mounting flange 40. The flange 34 supports a portion 42 of the elastomeric seal body which will engage the counterbore surface 24 to form a tight seal thereagainst. The should 36 serves as an abutting surface to limit the axial travel of the nose 44 of the metal unitizing collar generally designated 46 and shown to include axial and radial flanges 48, 50 (FIG. 2). As shown in FIG. 3, when the nose 44 and the radially inner surface of the flange 48 are associated with the shoulder and collar 36, 38, respectively, these sealed parts are locked together as a unit.

An elastomeric seal body generally designated 52 includes the portion 42 referred to earlier, as well as a radially extending neck portion 54 which surrounds the radially extending seal lip mounting flange 40. The primary seal lip body 56 includes an oil side surface 58 and an air side surface 60, each of frustoconical configuration and meeting at a seal band area 62. A secondary or dirt lip 64 also forms a part of the elastomeric seal body 52 as does a contoured snubber or spacer 66, the purpose of which is referred to herein. Referring again to FIG. 2, radially inner mounting assembly 32 is shown to include an annular metal portion generally designated 68 and shown to include axial and radial flanges 70, 72 and a second inner radial flange 74. The radially outer surface 76 of the axial flange 70 cooperates with the seal band 62 to form the primary seal, that is, the seal created between relatively movable parts.

A generally annular plastic member 78 having an L-shaped cross-section is shown to have portions bonded to the outer radial flange 72. Spaced axially inwardly from the axial flange 80 of the element 78 are a pair of relatively rigid locating rings 82, 84 of secondary seal means in the form of compressible square or rectangular cross-section which serve to confine a pair of elastomeric O-rings 86, 88.

When the components of FIG. 2 are assembled, as by exerting an axial force on the elements 32, 46 in the direction shown by the arrow "F" (FIG. 2), a unitized seal of the general form shown in FIG. 3 will result. Here, it is shown that the unitizing collar assembly 46 has been pressed into place to hold the units together.

The dirt lip 64 has been flattened (made more radial) by contact with the radial surface 90 of the flange 72, and the snubber 66 is shown to engage the flange 72 to prevent undue axially inward movement of the assembly 32. The radial flange 50 on the unitizing assembly 46 is then spaced just apart from the plastic flange.

When a seal such as that shown in FIGS. 2 and 3 is assembled over a shaft such as the shaft 28, an assembly such as that shown in FIG. 1 results.

While the seals of FIG. 1 and 2 are shown to be identical, the seal of FIG. 3 is illustrated as being virtually identical, except that the locating ring 82a is shown as being wider than its counterpart 82 in FIG. 2 and the ring 84 of FIG. 2 has no counterpart in the seal of FIG. 3. Otherwise, the assemblies including the O-rings 86, 88 are the same. The flange 74 in FIG. 3 serves the same purpose as the ring 84 in FIGS. 1 and 2.

As installed, the outer surface 92 of the rubber body 42 may more or less tightly engage the counterbore 24, and the O-rings 86, 88 will be deformed sufficiently to form the seal by the contact with the surface 26 of the shaft 28.

In considering FIGS. 1–3, it will be seen that one form of seal made according to the invention include a first seal assembly having portions adapted to be received within a counterbore, another portion adapted to cooperate with the seal lip to form the primary seal, and third portion to comprise a unitizing element. The second portion includes a shaft-engaging portion and a companion flange for cooperation with the seal lip to form the primary seal, while the unitizing assembly is adapted to hold the first and second parts in assembled relation for shipping, handling and installation.

Referring now to FIG. 4, a very similar seal assembly generally designated 20b is shown. This unit includes a similar mounting assembly 30b, unitizing assembly 46b and a companion flange or second seal assembly 32b. In the embodiment of FIG. 4, the plastic element 78b is similar to its counterpart in FIG. 2, for example, except that the radial flange 80b is considerably longer, and only a single O-ring 86b is used. In other respects, the seal is the safe as its counterpart of FIGS. 1–3. The use and installation of the seal are likewise the same, and the seal of FIG. 4 is typically used where a single O-ring is sufficient to provide the required secondary seal.

Referring now to FIG. 5, a further embodiment of the invention generally designated 20c is shown. This unit is identical to the seals of FIGS. 1–4, except that the flange 78c is made entirely from a plastic or like material. This unit includes a radially inner plastic face 79c adapted to engage an associated shaft, and includes no O-rings at all. This form of seal is suitable for installation where the shaft with which it is associated is precisely ground and wherein the radially extending boy 80c of the flange 78c can be deformed sufficiently to provide a fluid-tight seal, and yet wherein the parts can be assembled without the use of special tools or applying unusual force. In some cases, the plastic or like material from which the element 78c is made may be somewhat more pliable than in its counterpart in the seals of FIGS. 1–4.

Figure 6:
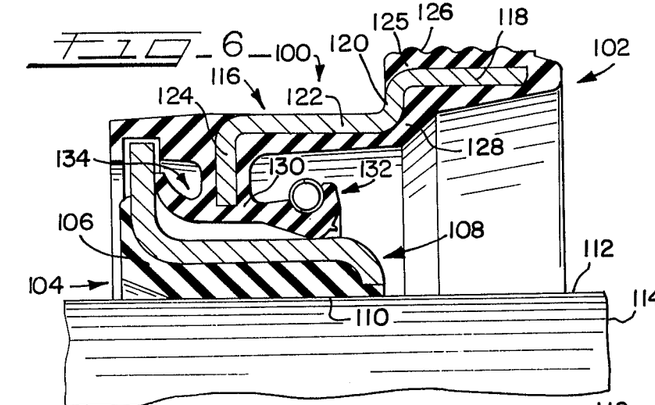

FIG. 6 shows an improved form of unitized seal made according to the invention. The seal of FIG. 6, generally designated 100, also includes an outer portion generally designated 102 and an inner portion generally designated 104. The outer assembly 102 includes portions adapted to be received within a counterbore (not shown in FIG. 6). An inner portion 104 of the assembly 100 includes a metal or like rigid companion flange 108 having an elastomeric sleeve 106 bonded thereto. The collar 106 includes an inwardly directed surface 110 adapted to sealingly engage an outwardly directed circumferential surface 112 of a shaft or stub 114.

Figure 7:
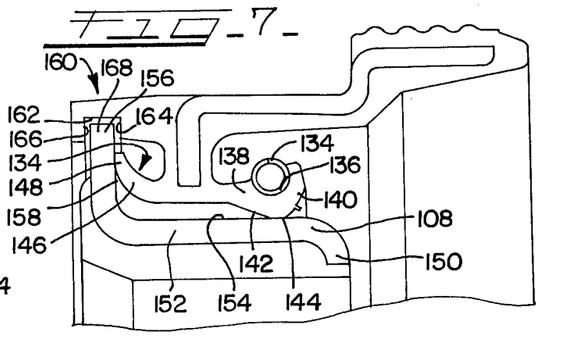
FIG. 7 is a view of the seal of FIG. 6, but showing the seal without cross-hatching for clarity.
Figure 8:
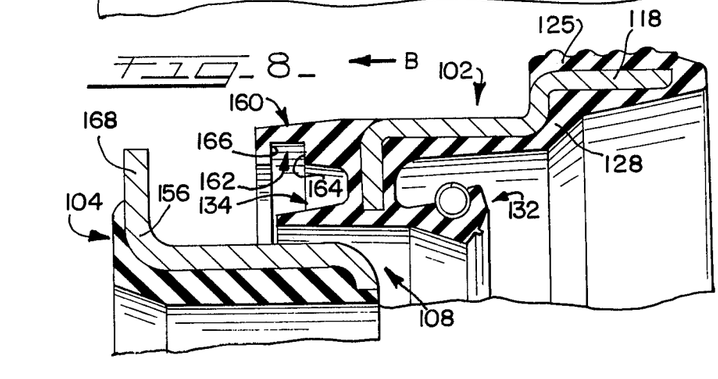
FIG. 8 is a vertical sectional view of the seal of FIG. 6, but showing the same in a partially exploded or disassembled relation.

In the embodiment of FIGS. 6–8, the outer assembly 102 includes a mounting flange generally designated 116 and includes an enlarged diameter axial flange 118, a shoulder 120 and a reduced diameter collar 122, terminating in an inwardly directed or radial flange 124 which serves to mount the elastomeric seal lip assembly.

The rubber portions of the outer unit 102 includes a radially outermost elastomeric outer body 125 with a surface 126 adapted to be received within an associated counterbore in snug sealing relation, an inner body 128 which includes a neck portion 130 from which extends a primary lip seal assembly generally designated 132 and an auxiliary or so-called dirt excluder lip assembly generally designated 134. In FIG. 7, it is shown that the primary seal lip assembly 132 includes a garter spring 135 disposed in a spring groove 136 and that the seal lip body 138 includes oil and air side surfaces 140, 142 respectively of generally frustoconical configuration which meet to define a seal band area 144. The dirt lip 134 includes a sealing body 146 of thin cross-section adapted to provide a flexible lip and terminating in a dirt lip seal edge 148.

As pointed out, the companion flange assembly 104 includes a radially inwardly extending flange 150, an axial flange 152 having a radially outwardly directed surface 154 which operates as a sealing surface for the seal band 144 and which makes sealing contact therewith.

A radial flange portion 156 of the member 106 includes an axially inwardly directed surface 158 adapted to cooperate with the dirt lip 148 to provide an excluder seal.

An important feature of the seal of FIG. 7 is that the unitizing is achieved entirely by means of an elastomeric collar generally designated 160 and shown to include a circumferential groove 162 (FIG. 8) having axially inner and outer wall surfaces 164, 166 which serve to confine the outermost portions 168 of the radial unitizing flange 156. The advantage of the seal assembly of FIGS. 6–8 is that unitizing is achieved without the need for press fitting of metal parts. The rigidity of the elastomeric collar 160 is such that it will effectively unitize the seal, but that it will not require special assembly techniques involving metal-to-metal assembly as would be required in assembling the seals of FIGS. 1–5, for example.

Referring again to FIG. 8, the seal of FIGS. 6 and 7 is shown in a disassembled form. When an axial force is applied in the direction to move the outer assembly 102 in the direction shown by the arrow "B", the flexible elastomeric collar 160 snaps over the outermost portion 168 of the metal flange 156, locking the two elements together and positioning the seal band 144 in the desired relation to the surface 154 with which it will cooperate to form the primary seal.

As the same time, the dirt lip 134, which is shown as extending axially in FIG. 8, engages the curved transistion surface portion of the stiffener 152 and rides therewith upwardly and radially outwardly until it is deformed as schematically shown in FIGS. 6 and 7. Consequently, its own resiliency, urging it to a relaxed position, provides a good secondary reaction sealing force.

The seal assembly of FIGS. 6–8 may thus be manufactured and assembled without the need for precisely matching the diameters of the associated metal stampings, and without the need for form a third or unitizing member from metal for this purpose. When the seal is installed, there is little if any tendency for the parts to become separated, and the unitizing assembly 160 is more than sufficient for holding the seal together after assembly for shipment and installation purposes.

Figure 9:
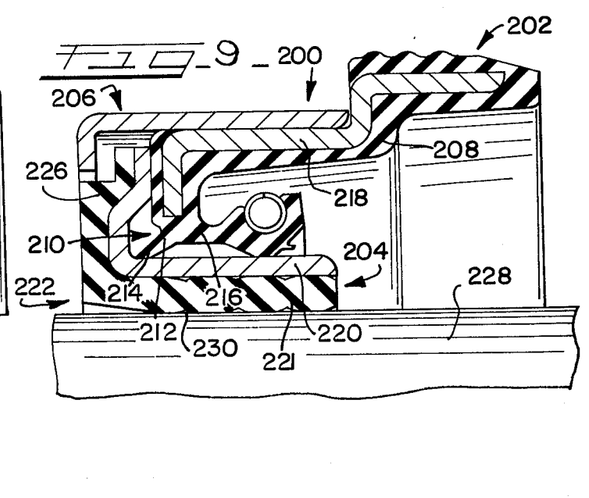
FIG. 9 is a vertical sectional view of a still further form of a seal made according to the invention and showing the seal in assembled position of use with an associated shaft.

Referring now to FIG. 9, a composite seal unit generally designated 200 is shown to be provided and to be similar in concept to the other embodiments shown. Generally, this seal includes an outer mounting assembly 202, an inner mounting assembly generally designated 204, and a unitizing member generally designated 206. The outer mounting rubber body portion 208 is the same as its counterparts in FIGS. 1–8, except that the dirt lip generally designated 210 in FIG. 9 is of the conventional type seen in ordinary oil seals, that is, it includes a flexible lip portion 212 terminating at a contact locus 214 radially inwardly of the seal body 216. In the seal of FIG. 9, the same reduced diameter unitizing collar 218 is provided for reception of the sleeve or unitizing member 206. The basic differences between the seals of FIG. 9, and those of FIGS. 1–5 are that the inner member 204, in addition to possessing the stiffener 220, includes a manually removable rubber body generally designated 222 and shown to include axial and radial flanges 224, 226.

Since the body 222 is elastomeric, it may be sized to be press fit over the shaft 228. If necessary, circumferential grooves 230 may be provided to reduce the overall compressive stiffness of the body 222, with such grooves 230 being provided on both the inner and outer diameters of the axial flange 224.

Figure 11:
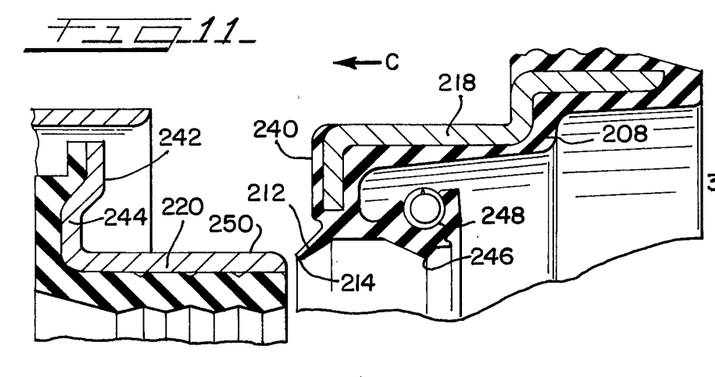
FIG. 11 is a vertical sectional view of the seal of FIGS. 9 and 10 showing the components thereof in partially exploded relation.

The seal shown in FIG. 9 may be assembled in the same way as its counterparts, namely, by co-axially aligning the inner and outer elements as shown in FIG. 11, moving them axially together as by movement in the direction of arrow "C" shown in FIG. 11, and then press fitting the unitizing member in place as shown. The rubber bumper surface 240 (FIG. 11) engages an offset surface 242 on the radial flange 244 of the stiffener 220. As in the other applications, the primary seal is formed between the seal band 246 of the seal lip 248 and a radially outwardly directed surface 250 of the flange 220; the edge 214 of the dirt lip 212 also engages an axially spaced apart portion of this surface 250.

Figure 12:
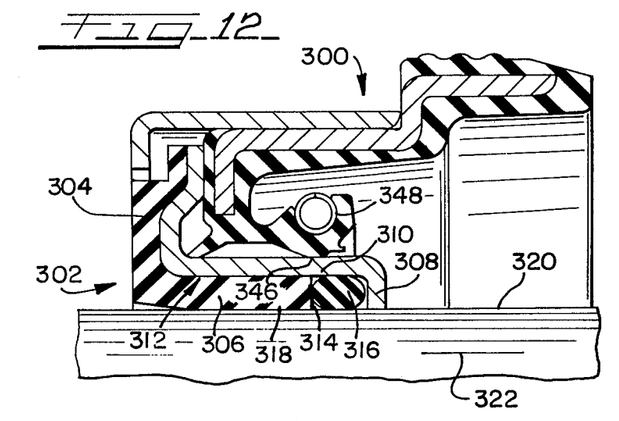
FIG. 12 is a vertical sectional view of a portion of a still further form of seal made according to the invention.
Figure 13:
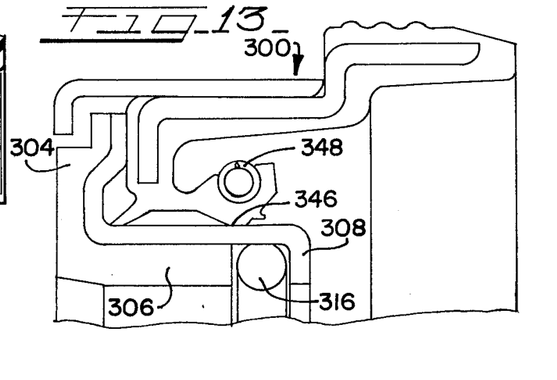
FIG. 13 is a view of the seal of FIG. 12, shown without cross-hatching.

Referring now to FIGS. 12 and 13, an embodiment of the invention generally designated 300 is shown. This seal is identical to that shown in FIGS. 9–11, inclusive, except that the mounting unit for the inner seal portion 302 not only includes an annular locating ring generally designated 302 and shown to include radial and axial flanges 304, 306, but further includes a radial flange 308 extending inwardly from the axial flange 310 of the metal stiffener 312. The end wall 314 of the axial flange 308 of the mounting unit 302 and a wall of the radial flange 308 of the stiffener 310 serve to locate therebetween an elastomeric O-ring 316. The combination of this O-ring and the inner diameter surface 318 of the unit 302 cooperate to affix the seal assembly 300 securely onto the outer diameter 320 of an associated shaft 322.

Figure 10:
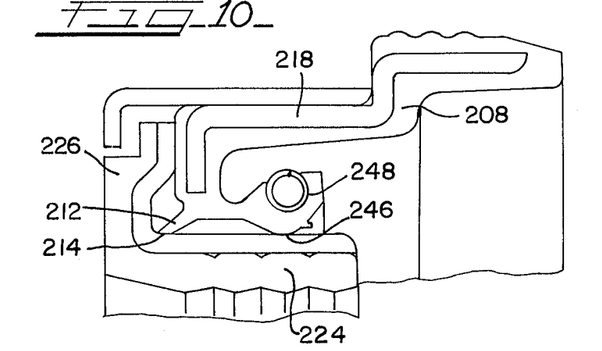
FIG. 10 is a view of the seal of FIG. 9, shown without cross-hatching.

As shown in FIG. 13, the portions of the seal including the seal band 346, the garter spring 348, etc. are the same as their counterparts in the seals of FIGS. 9–11, for example.

In the use of the present invention, it is possible for the manufacturer to sell, as a unit, a seal which is capable of being installed in relatively heavy duty applications such as truck and trailer axles and the like, by hand or with simple tools. The seal is adapted to use oil as the sealed medium as opposed to grease, and this is a desirable feature for operators seeking extended wheel bearing life.

In those designs using a captive O-ring, advantage is taken of the resiliency of the O-ring and the precision, size and dixensional stability of a plastic inner diameter part. In those seals using a completely elastomeric inner diameter portion, advantage is taken of the use of ribs or the like to increase the general resilience of the unit, and to insure that there is a considerable axial length of rubber in contact with the shaft or stub to seal to provide a tight secondary seal.

Among other specific advantages possessed by one or more seal constructions illustrated and attributable to the present invention are the ease of manufacturing the parts in question, including the ability to remove the parts from the molds in which they are assembled.

In seals made according to the invention, the secondary seal areas are not vulnerable to damage during shipping; however, the seals can be non-destructively disassembled for additional inspection or quality control examination. Thus, while a user would receive an assembled seal which would be unlikely to have seal lip damage, the seal could still be inspected at a quality control point within the purchaser's facility and then be reassembled for handling and installation by personnel employed in assembling the entire sealed mechanism.

The arrangement of the inner and outer diameter rubber formulation is such that the seal is relatively easy to install. It does not require deformation of a metal member for such installation. On the other hand, having the rubber bonded to the metal, secondary sealing problems are reduced and the number of components in the assembly are reduced to two. Accordingly, the rubber components will not separate from the metal components during installation, in contrast to some other, unbonded prior art seals. Accordingly, where freedom from damage during installation and use is an important consideration, together with outstanding seal performance in use, seals of the present invention are highly advantageous, when used on truck and trailer axle seals wherein the sealed assemblies have been converted from the use of grease to the use of oil as the sealed medium. Inasmuch as the oil lubricated wheel bearing seal is coming into increasingly widespread use, the present invention promises significant economic advantages.

It will thus be seen that the present invention provides a novel seal having a number of advantages and characteristics including those pointed out above and others which are inherent in the invention. A preferred embodiment of the invention having been described by way of illustration, it is anticipated that changes and modifications of the described seal will occur to those skilled in the art and that such changes and modifications may be made without departing from the spirit of the invention or the scope of the appended claims.

We claim:

1. A unitized oil seal assembly comprising, in combination, first and second components adapted to cooperate with each other in use to form said unitized assembly, said first component being a lip-containing assembly and said second component being a companion flange assembly, said first component comprising an annular casing made from a rigid material and having at least one axial flange and one radial flange, a rubber element bonded to and surrounding a portion of said first component casing, said rubber element including an annular portion covering at least a portion of the exterior of said axial flange on said first component casing so as to form a rubber covered, outer diameter, secondary seal-forming surface for said first component, and a seal body portion boned to said first component radial flange, said seal body portion including a primary lip-forming part extending generally axially inwardly from said first component radial flange, said lip forming part comprising oil and air side frustoconical surfaces joined at their inner margins to form a primary lip seal band, and an auxiliary lip forming part extending at least partially axially outwardly of said first component radial flange and being defined by an annular surfaces which cooperate to define the body of said auxiliary lip, said second component including a single rigid casing portion with axial and radial companion flanges, a radially outwardly directed surface of said axial companion flange being sized so as to engage said seal band of said primary lip in fluid-tight relation, with one of said axial and radial surfaces of said companion flange being also sized and positioned to engage said auxiliary lip to form an excluder seal, an annular body of seal-forming material bonded to a radially inwardly directed surface of said axial companion flange and adapted for engagement with an associated machine element, said axial companion flange having a radially inturned flange thereon and forming the axially innermost end thereof, said innermost end being free from radially outwardly extending portions and having a reduced diameter relative to said radially outwardly directed axial flange surface, and unitizing means extending axially outwardly from at least one of said flanges of said first component, said unitizing means having at least one radially extending surface adapted to cooperate with another radially extending portion of said first component to assist in axial positioning of said second component by limiting relative axial movement of said first and second component and to insure mutual engagement of said primary and auxiliary seal lips with sealing surfaces on said companion flange.

2. A seal assembly as defined in claim 1 wherein said unitizing means comprises a third component in the form of a metal casing having an axial flange engaged with a portion of said first component, and a radially inwardly extending flange lying axially outwardly of said radial flange of said second component.

3. An oil seal assembly as defined in claim 1 wherein said annular portion of said rubber element surrounding said larger axial flange includes a plurality of grooves formed in the outer diameter thereof to reduce the radial compressive stiffness of said element for ease of installing said first component in an associated machine member.

4. An oil seal assembly as defined in claim 1 wherein said auxiliary lip extends partially radially outwardly and is adapted to engage said radial surface of said companion flange.

5. An oil seal assembly as defined in claim 1 wherein said auxiliary lip extends at least partially radially inwardly and is adapted to engage an axial flange surface of said companion flange.

6. An oil seal assembly as defined in claim 1 wherein said rubber element further includes an axially extending snubber portion bonded to said radial flange of said first component and extending axially outwardly therefrom, said snubber portion being adapted to limit the axial inward movement of said companion flange.

7. An oil seal assembly as defined in claim 1 wherein said annular body of seal forming material is a body made from thermoplastic material.

8. A seal assembly as defined in claim 1, which further includes at least one "O" ring adapted to engage said associated machine element, and wherein said annular body of seal forming material is a body of thermoplastic material constructed and arranged for axially positioning said "O" ring.

9. A seal assembly as defined in claim 1 which further includes a secondary seal forming "O" ring lying radially inwardly of said axial companion flange, said "O" ring being located at least in part by engagement with a portion of said inturned flange on said innermost end of said axial companion flange.

10. A seal assembly as defined in claim 1 wherein said annular body of seal forming material comprises a rubber sleeve having a contoured radially inwardly directed surface for engaging a part of said machine element.

11. An oil seal assembly as defined in claim 1 wherein said unitizing means comprises a molded rubber collar bonded to one of said flanges of said first component and extending axially outwardly therefrom, said collar including means defining a circumferential groove therein for receiving a radially outer portion of said radial companion flange, whereby said unitized assembly is adapted for non-destructive disassembly by deformation of said elastomeric rubber collar.

12. A unitized oil seal assembly comprising, in combination, first and second components adapted to cooperate with each other in use to form said unitized assembly, said first component being a lip-containing assembly and said second component being a companion flange assembly, said first component comprising an annular casing made from a rigid material and having a pair of axial flanges, a radial flange, and a transition flange extending between said axial flanges to define an annular shoulder area, a rubber element bonded to and surrounding a portion of said first component casing, said rubber element including an annular mounting portion covering the larger of said axial flanges on said first component casing so as to form a rubber covered, outer diameter, secondary seal-forming surface for said first component, a seal body portion including a primary lip forming part extending generally axially inwardly from said first component radial flange and having oil and air side frustoconical surfaces joined at their inner margins to form a primary lip seal band of intended contact with a portion of said second component, and an auxiliary lip defined by annular surfaces extending at least partially axially outwardly of said first component radial flange, said seal body further including a unitizing collar bonded at its axially inner end to said radial flange of said first component, said collar including axially inner and spaced apart walls defining therebetween a circumferential locating groove, said second component including a single rigid casing portion with one axial companion flange and one radial companion flange, said axial companion flange having a center portion and inner and outer axial ends, with said radial companion flange being joined to said axially outer end thereof, with said radially outwardly directed surface of said center portion being sized so as to engage said seal band in fluid-tight relation, with one of said axial and radial companion flange surfaces also being sized and positioned to engage said auxiliary lip to form an excluder seal, a secondary seal-forming portion affixed to at least a radially inwardly directed portion of said axial companion flange center portion and being adapted to form a fluid-tight secondary seal with an associated machine element, with a radially outer portion of said radial companion flange being received within said groove on said unitizing collar for axially positioning said second component and to insure mutual engagement of said primary and auxiliary seal lips with said companion flange, said axially inner end of said axial companion flange being free from any radially outwardly directed portion and having a radially inwardly extending surface portion of reduced diameter relative to the diameter of said axial companion flange center portion surface to prevent seal band damage during relative axial movement of said first and second components during seal assembly.

13. A seal unit as defined in claim 12 wherein said reduced diameter surface on said axially inner end of said companion flange forms a part of a radially inwardly extending end flange element.

* * * * *

REEXAMINATION CERTIFICATE (3332th)

United States Patent [19]
Jackowski et al.

[11] B1 4,448,426
[45] Certificate Issued Sep. 23, 1997

[54] UNITIZED OIL SEALS

[75] Inventors: Ronald A. Jackowski, Algonquin; Glenn W. Peisker, Barrington, both of Ill.

[73] Assignee: SKF USA Inc., Elgin, Ill.

Reexamination Request:
No. 90/003,436, May 17, 1994

Reexamination Certificate for:
Patent No.: 4,448,426
Issued: May 15, 1984
Appl. No.: 280,888
Filed: Jul. 6, 1981

[51] Int. Cl.⁶ .................................................. F16J 15/34
[52] U.S. Cl. ............................................. 277/37; 277/153
[58] Field of Search .............................. 277/35, 37, 152, 277/153

[56] References Cited

U.S. PATENT DOCUMENTS

| | | |
|---|---|---|
| 2,867,457 | 1/1959 | Riesing et al. |
| 3,021,161 | 2/1962 | Rhoads et al. |
| 3,179,424 | 4/1965 | Carson et al. |
| 3,341,264 | 9/1967 | Otto |
| 3,531,168 | 9/1970 | Bainard ................ 277/37 |
| 4,037,849 | 7/1977 | Thumm |
| 4,226,426 | 10/1980 | Messenger ............ 277/37 |
| 4,283,063 | 8/1981 | Prescott |
| 4,327,922 | 5/1982 | Walther ................. 277/37 |

FOREIGN PATENT DOCUMENTS 1523310  8/1978  United Kingdom.

*Primary Examiner*—Daniel G. DePumpo

[57] ABSTRACT

A unitized oil seal with inner and outer rigid casings. A seal lip body with primary and auxiliary sealing lips is bonded to the outer casing, and the sealing lip cooperates with an axial flange on the inner casing to provide a fluid-tight seal band area. The outer casing includes an auxiliary rubber or metal element which positions a locking flange on the inner casing against axial displacement. The axial flange on the inner casing has a radially inturned edge on the end opposite the locking flange to facilitate assembly. The inside diameter of the inner casing and the outside diameter of the outer casing include rubber or plastic sleeve for ease of installation on an associated sealed mechansim.

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1, 2, 11 and 12 are determined to be patentable as amended.

Claims 3-10 and 13, dependent on an amended claim, are determined to be patenable.

New claims 14-23 are added and determined to be patentable.

1. A unitized oil seal assembly comprising, in combination, first and second components adapted to cooperate with each other in use to form said unitized assembly, said first component being a lip-containing assembly and said second component being a companion flange assembly, said first component comprising [an] *a one-piece* annular casing made from a rigid material and having at least one axial flange and one radial flange, a rubber element bonded to and surrounding a portion of said first component casing, said rubber element including an annular portion covering at least a portion of the exterior of said axial flange on said first component casing so as to form a rubber covered, outer diameter, secondary seal-forming *exposed exterior* surface for said first component, and a seal body portion bonded to said first component radial flange, said seal body portion including a primary lip-forming part extending generally axially inwardly from said first component radial flange, said lip forming part comprising oil and air side frustoconical surfaces joined at their inner margins to form a primary lip seal band, and an auxiliary lip forming part extending at least partially axially outwardly of said first component radial flange and being defined by [an] annular surfaces which cooperate to define [the] *a flexible* body [of] *forming said auxiliary lip,* said second component including a single rigid casing portion with axial and radial companion flanges, a radially outwardly directed surface of said axial companion flange being sized so as to engage said seal band of said primary lip in fluid-tight relation, with one of said axial and radial surfaces of said companion flange being also sized and positioned to engage said auxiliary lip to form an excluder seal, an annular body of seal-forming material bonded to a radially inwardly directed surface of said axial compansion flange and adapted for engagement with an associated machine element, said axial companion flange having a radially inturned flange thereon [and] forming the axially innermost end thereof, said innermost and being free from radially outwardly extending portions and having a reduced diameter relative to said radially outwardly directed axial flange surface, and unitizing means extending axially outwardly from at least one of said flanges of said first component, said unitizing means having at least one [radially extending] surface [adapted to cooperate with another radially extending portion of said first component to assist in axial positioning of said second component by limiting] *lying axially outwardly of a part of said radial companion flange and extending radially inwardly so as to radially overlap a part of said radial companion flange, and, in cooperation with said first component radial flange, to enclose an outer margin of said radial compansion flange and thereby limit* relative axial movement of said first and second components and to insure mutual engagement of said primary and auxiliary seal lips with sealing surfaces on said compansion flange.

2. A seal assembly as defined in claim 1 wherein said unitizing means comprises a third component in the form of a metal casing having an axial flange engaged with a portion of said first component. [, and a radially inwardly extending flange lying axially outwardly of said radial flange of said second component.]

11. An oil seal assembly as defined in claim 1 wherein said unitizing means comprises a molded rubber collar bonded to one of said flanges of said first component and extending axially outwardly therefrom, said collar including [means] *both axially outer and inner walls* defining a circumferential groove therein, *both of said walls of said groove radially overlapping* [for receiving] a radially outer portion of said radial companion flange, whereby said unitized assembly is adapted for non-destructive disassembly by deformation of said elastomeric rubber collar.

12. A unitized oil seal assembly comprising, in combination, first and second components adapted to cooperate with each other in use to form said unitized assembly, said first component being a lip-containing assembly and said second component being a companion flange assembly[,] *having a one-piece rigid casing portion with one axial companion flange and one radial companion flange with a radially outer free end portion,* said first component comprising an annular casing made from a rigid material and having a pair of axial flanges, a radial flange, and a transition flange extending between said axial flanges to define an annular shoulder area, a rubber element bonded to and surrounding a portion of said first component casing, said rubber element including an annular mounting portion covering the larger of said axial flanges on said first component casing so as to form a rubber covered, outer diameter, secondary seal-forming surface for said first component, a seal body portion including a primary lip forming part extending generally axially inwardly from said first component radial flange and having oil and air side frustoconical surfaces joined at their inner margins to form a primary lip seal bnad of intended contact with a portion of said second component, and [an] *a flexible* auxiliary lip defined by annular surfaces extending at least partially axially outwardly of said first component radial flange, said seal body further including a unitizing collar bonded at its axially inner end to said radial flange of said first component, said collar including *an* axially inner [and spaced apart walls defining] *wall and an axially outer wall, each of said walls having a portion radially overlapping said free end portion of said radial companion flange so as to define* therebetween a circumferential locating groove[,] *surrounding three sides of said free end of said radial companion flange,* [said second component including a single rigid casing portion with one axial companion flange and one radial companion flange,] said axial companion flange having a center portion and inner and outer axial ends, with said radial companion flange being joined to said axially outer end thereof, with said radially outwardly directed surface of said center portion being sized so as to engage said *primary lip* seal band in fluid-tight relation, with one of said axial and radial companion flange surfaces also being sized and positioned to engage said *flexible* auxiliary lip to form an excluder seal, a secondary seal-forming portion affixed to at least a radially inwardly directed portion of said axial companion flange center portion and being adapted to form a fluid-tight secondary seal with an associated machine element, with [a radially outer] *said free end* portion of said radial companion flange being received within said *locating* groove on said unitizing collar for axially positioning said second component and to insure mutual engagement of said primary and auxiliary seal lips with said companion flange, said axially inner end of said axial companion flange being free from any radially outwardly directed portion and having a radially inwardly extending surface portion of reduced diameter relative to the diameter of said axial companion flange center portion surface to prevent seal band damage during relative axial movement of said first and second components during seal assembly.

14. A unitized oil seal assembly comprising, in combination, first and second components adapted to cooperate with each other in use to form said unitized assembly, said first component being a lip-containing assembly and said second component being a companion flange assembly, said first component comprising an annular casing made from a rigid material and having a radial flange, a larger diameter, axially inner axial flange, a transition flange and an axially outer, smaller diameter flange, a rubber element bonded to and surrounding a portion of said first component casing, said rubber element including an annular portion covering the exterior of said larger diameter axial flange on said first component casing so as to form a rubber covered, outer diameter, exposed secondary seal-forming surface for said first component, and a seal body portion bonded to said first component radial flange, said seal body portion including a primary lip-forming part extending generally axially inwardly from said first component radial flange, said lip forming part comprising oil and air side frustoconical surfaces joined at their inner margins to form a primary lip seal band, and an auxiliary lip forming part extending at least partially axially outwardly of said first component radial flange and being defined by annular surfaces which cooperate to define the body of said auxiliary lip, said second component including a single rigid casing portion with axial and radial companion flanges, a radially outwardly directed surface of said axial companion flange being sized so as to engage said seal band of said primary lip in fluid-tight relation, with one of said axial and radial surfaces of said companion flange being also sized and positioned to engage said auxiliary lip to form an excluder seal, an annular body of seal-forming material bonded to a radially inwardly directed surface of said axial companion flange and adapted for engagement with an associated machine element, said axial companion flange having a radially inturned flange thereon and forming the axially innermost end thereof, said innermost end being free from radially outwardly extending portions and having a reduced diameter relative to said radially outwardly directed axial flange surface, and unitizing means in the form of a third metal casing component having an axial flange engaged with a portion of said first component and extending axially inwardly of said first component radial flange a distance sufficient to surround a portion of said smaller diameter surface but not axially inwardly beyond said transition surface, thereby leaving said rubber seal-forming surfce exposed, and a radially inwardly extending flange lying axially outwardly of said radial flange of said second component, said unitizing means being adapted to cooperate with another radially extending portion of said first component to assist in axial positioning of said second component by limiting relative axial movement of said first and second component and to insure mutual engagement of said primary and auxiliary seal lips with sealing surfaces on said compansion flange.

15. An oil seal assembly as defined in claim 14 wherein said annular portion of said rubber element surrounding said larger axial flange includes a plurality of grooves formed in the outer diameter thereof to reduce the radial compressive stiffness of said element for ease of installing said first component in an associated machine member.

16. An oil seal assembly as defined in claim 14 wherein said auxiliary lip extends partially radially outwardly and is adapted to engage said radial surface of said compansion flange.

17. An oil seal assembly as defined in claim 14 wherein said auxiliary lip extends partially radially inwardly and is adapted to engage an axial flange surface of said companion flange.

18. An oil seal assembly as defined in claim 14 wherein said rubber element further includes an axially extending snubber portion bonded to said radial flange of said first component and extending axially outwardly therefrom, said snubber portion being adapted to limit the axial inward movement of said companion flange.

19. An oil seal assembly as defined in claim 14 wherein said annular body of seal forming material is a body made from thermoplastic material.

20. A seal assembly as defined in claim 14 which further includes at least one "O" ring adapted to engage said associated machine element, and wherein said annular body of seal forming material is a body of thermoplastic material constructed and arranged for axially positioning said "O" ring.

21. A seal assembly as defined in claim 14 which further includes a secondary seal forming "O" ring lying radially inwardly of said axial companion flange, said "O" ring being located at least in part by engagement with a portion of said inturned flange on said innermost end of said axial companion flare.

22. A seal assembly as defined in claim 14 wherein said annular body of seal forming material comprises a rubber sleeve having a contoured radially inwardly directed surface for engaging a part of said machine element.

23. A seal assembly as defined in claim 1 wherein said annular casing of said first component comprises larger and smaller diameter axial flange portions connected by a transition portion, wherein said portion of said first component casing to which said rubber element is bonded includes said larger diameter flange, and wherein said unitizing means comprises a third component in the form of a metal casing with an axial flange having an inner end surrounding at least a portion of said smaller diameter axial flange of said first component casing, and extending axially inwardly not beyond said transition portion.

* * * * *